United States Patent [19]

Bosler

[11] Patent Number: 5,314,325
[45] Date of Patent: May 24, 1994

[54] APPARATUS FOR CONTINUOUS VACUUM FORMING OF A HOT PLASTICIZED MATERIAL ON A MOVING FLAT FORMING SURFACE

[76] Inventor: Kenneth Bosler, 82 Mulberry Dr., Holland, Pa. 18966

[21] Appl. No.: 25,519

[22] Filed: Mar. 3, 1993

[51] Int. Cl.⁵ .................................... B29C 59/00
[52] U.S. Cl. ................... 425/384; 264/555; 264/571; 264/210.1; 425/385; 425/388; 425/818
[58] Field of Search ............... 264/101, 210.1, 555, 264/237, 557, 571; 425/384, 385, 387.1, 388, 818, DIG. 60, DIG. 119

[56] References Cited

U.S. PATENT DOCUMENTS

| | | |
|---|---|---|
| 2,218,338 | 10/1940 | Manning . |
| 2,660,757 | 12/1953 | Smith et al. .................... 264/555 |
| 2,776,451 | 1/1957 | Chavannes .................... 264/555 |
| 2,855,653 | 10/1958 | Kastenbern . |
| 3,099,043 | 7/1963 | Held, Jr. . |
| 3,126,580 | 3/1964 | Paschke . |
| 3,178,494 | 4/1965 | Tisdale .......................... 425/388 |
| 3,335,207 | 8/1967 | Richie ........................... 264/555 |
| 3,872,199 | 3/1975 | Ottinger . |
| 3,895,087 | 7/1975 | Ottinger et al. . |
| 3,897,530 | 7/1975 | Leathers ........................ 425/388 |
| 3,954,923 | 5/1976 | Valyi . |
| 3,957,414 | 5/1976 | Bussey, Jr. et al. ............ 425/388 |
| 3,966,383 | 6/1976 | Bussey, Jr. et al. ............ 425/388 |
| 3,982,868 | 9/1976 | Kinker . |
| 4,009,975 | 3/1977 | Ninomiya et al. . |
| 4,061,706 | 12/1977 | Duffield et al. . |
| 4,128,369 | 12/1978 | Kemerer et al. . |
| 4,315,885 | 2/1982 | Lemelson . |
| 4,332,847 | 6/1982 | Rowland . |
| 4,352,771 | 10/1982 | Szabo . |
| 4,464,319 | 8/1984 | Halter et al. . |
| 4,477,243 | 10/1984 | Wallstén . |
| 4,487,730 | 12/1984 | Larribe . |
| 4,495,135 | 1/1985 | White . |
| 4,582,666 | 4/1986 | Kenworthy et al. . |
| 4,634,358 | 1/1987 | Dellbrugge . |
| 4,649,008 | 3/1987 | Johnstone et al. . |
| 4,656,722 | 4/1987 | Armstrong . |
| 4,657,625 | 4/1987 | Kawakami . |
| 4,702,877 | 10/1987 | Davis, Jr. . |
| 4,776,998 | 10/1988 | Davidson et al. . |
| 4,847,034 | 7/1989 | Araki et al. . |

Primary Examiner—Charles S. Bushey
Attorney, Agent, or Firm—Sperry, Zoda & Kane

[57] ABSTRACT

An apparatus for continuous vacuum forming of a hot plasticized material such as vinyl onto a moving flat forming surface defined between a first and second roller member which are continuously rotatable with a flexibly resilient belt and a woven flexible support belt extending therearound. The upper belt is of a flexibly rubber material and the lower belt is of an open woven metallic material to allow air to be drawn therethrough. These belts pass through a flat forming station positioned between two rollers against which vacuum forming is performed. A flexibly resilient pattern form is defined on the flexibly resilient belt including a plurality of vacuum apertures therein such that as the pattern form passes through the flat forming station a vacuum is applied through the woven support belt and to the apertures defined in the form to draw down the hot plasticized material onto the pattern form for continuous vacuum forming. The flexibility of the belts facilitates the vacuum forming operation and provides a flat surface against which the vacuum forming can be performed.

19 Claims, 3 Drawing Sheets

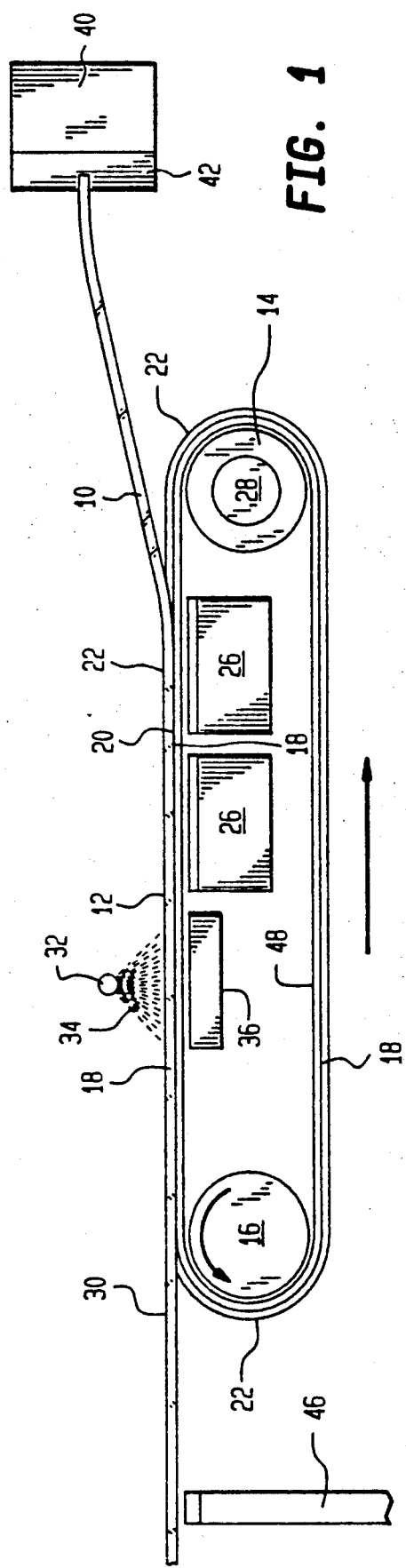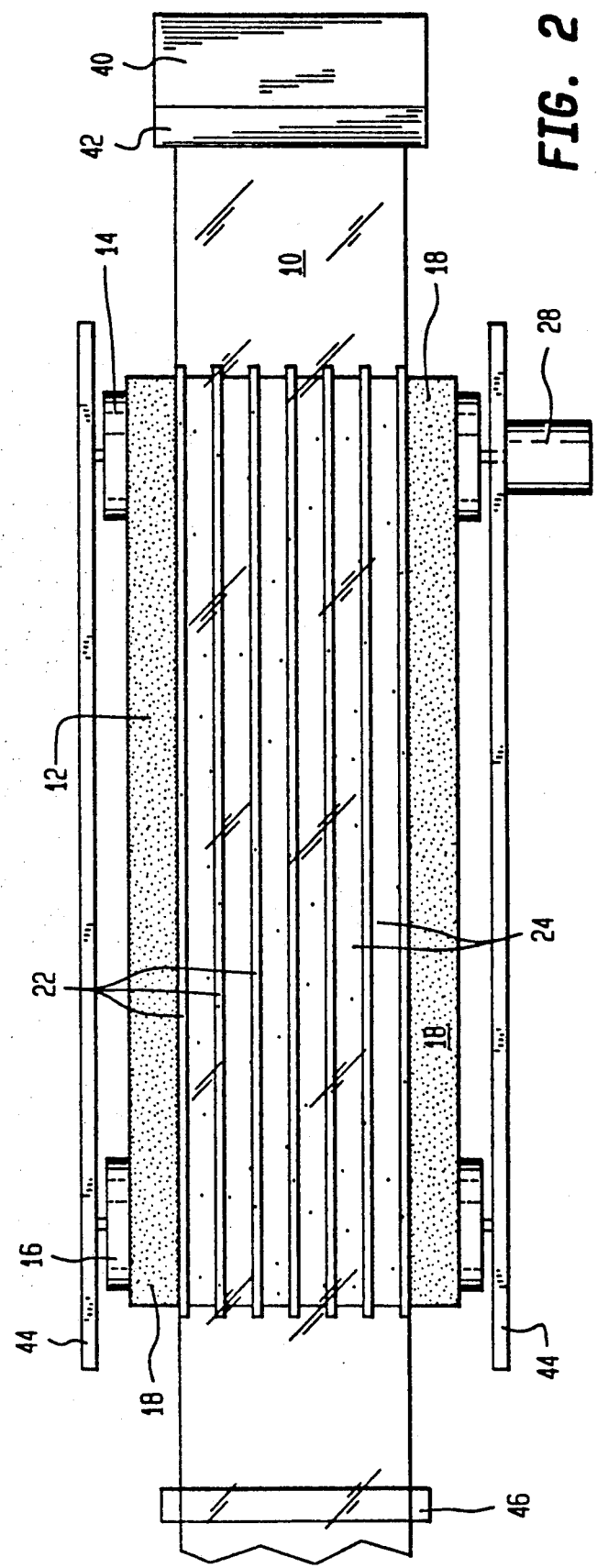

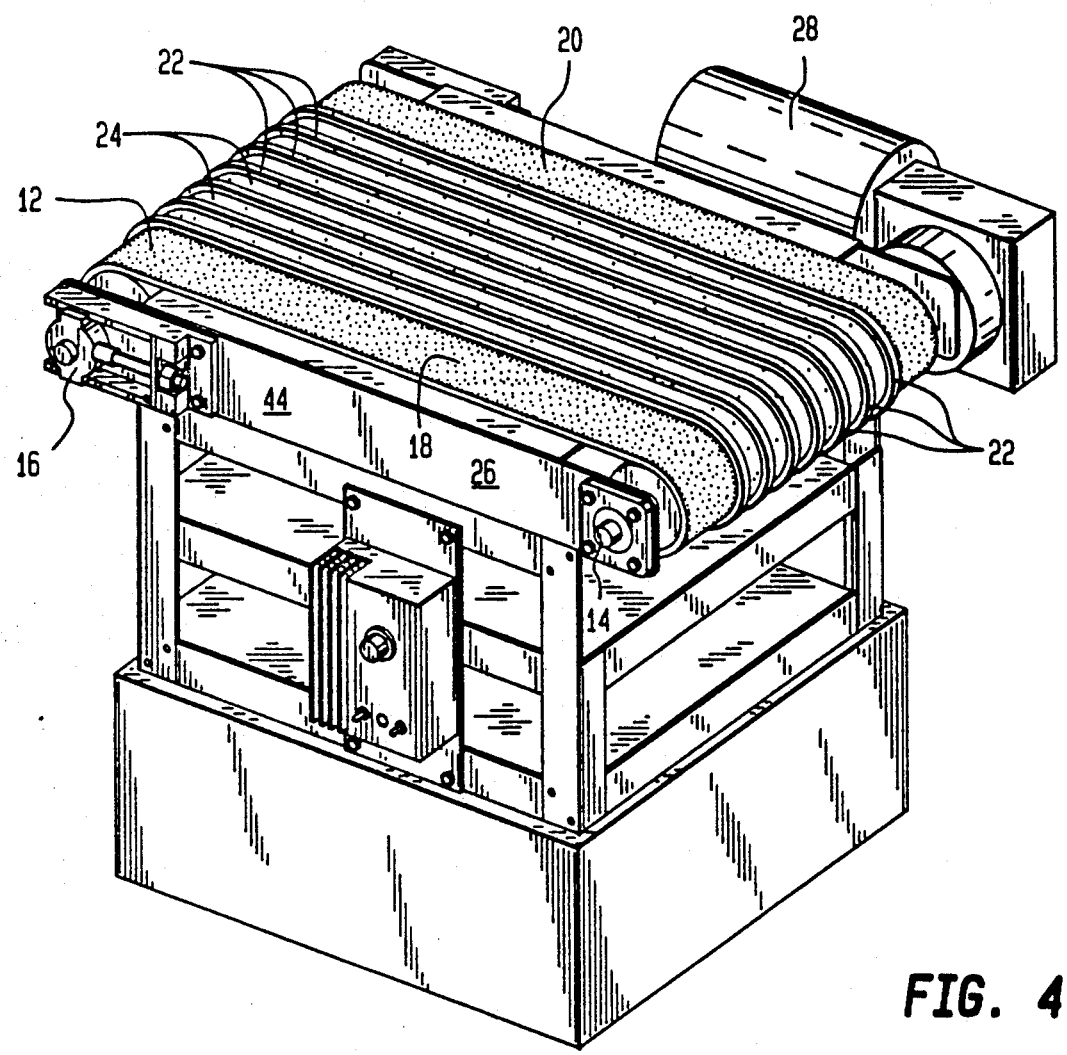
FIG. 4
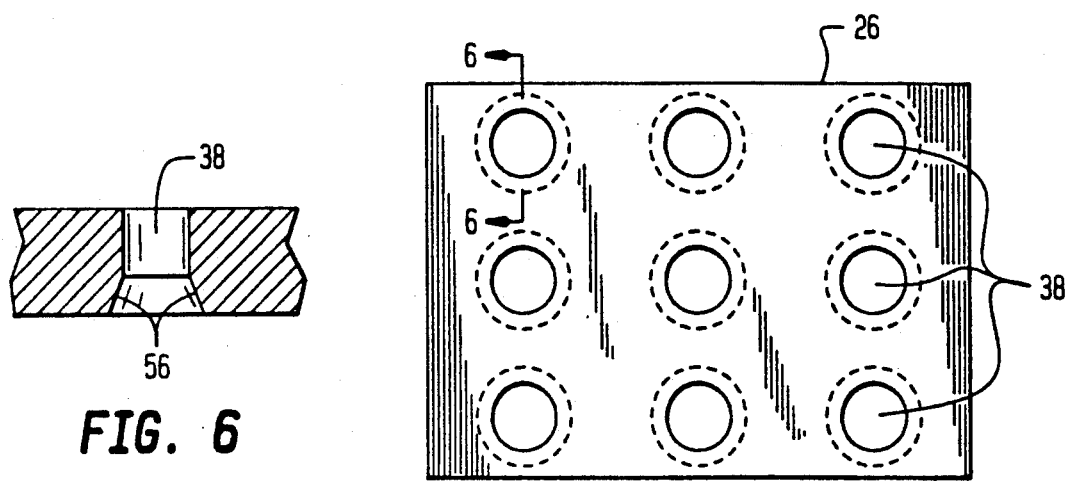
FIG. 6
FIG. 3

APPARATUS FOR CONTINUOUS VACUUM FORMING OF A HOT PLASTICIZED MATERIAL ON A MOVING FLAT FORMING SURFACE

BACKGROUND OF THE INVENTION

1. Field Of The Invention

The present invention deals with the field of vacuum forming systems. More particularly the present invention deals with the field of devices utilized for vacuum forming of hot plasticized material such as vinyl drawn normally from an extruder and heated.

Heretofore most devices make use of pattern forms rotating on cylindrical drums which require excessive additional instrumentation due to the fact that the forming surface is arcuate rather than flat. The present invention provides a novel means for utilizing a flexibly resilient belt and a metallic woven support belt thereunder with both belts extending between rollers. A flexibly resilient pattern form is positioned on the flexible resilient belt which passes through a flat forming surface which includes all of the advantages and none of the disadvantages of the use of a cylindrical or arcuate forming surface.

2. Description Of The Prior Art

Prior art systems have been disclosed for vacuum forming or for continuous process forming such as U.S. Pat. No. 2,218,338 patented Oct. 15, 1940 to F. W. Manning on a Method and Apparatus For Making Filter Fabric; U.S. Pat. No. 2,855,653 patented Oct. 14, 1958 to E. Kastenbein on an Apparatus For Making Tile Panels; U.S. Pat. No. 3,099,043 patented Jul. 30, 1963 to E. C. Held, Jr. on a Method and Apparatus For Vacuum Forming Hollow Articles; U.S. Pat. No. 3,126,580 patented Mar. 31, 1964 to H. Paschke on an Apparatus For Continuously Deforming Thermoplastic Foils; U.S. Pat. No. 3,872,199 patented Mar. 18, 1975 to Lester V. Ottinger and assigned to Champion International, Corporation, on a Method of Manufacturing A Foamed Urethane Structural Product Having High and Low Density Portions; U.S. Pat. No. 3,895,087 patented Jul. 15, 1975 to L. Ottinger et al on a Method Of Manufacturing A Molded Composite Urethane Foam Structural Panel; U.S. Pat. No. 3,954,923 patented May 4, 1976 to E. Valyi on a Method Of Making Composite Plastic Article; U.S. Pat. No. 3,982,868 patented Sep. 28, 1976 to William R. Rinker and assigned to The B. F. Goodrich Company, on a Continuous MOld Thermo Forming; U.S. Pat. No. 4,009,975 T. Ninomiya et al on a Device For Producing An Obliquely Oriented Film Of Thermoplastic Synthetic Resin; U.S. Pat. No. 4,061,706 patented Dec. 6, 1977 to P. Duffield et al on a Process For The Continuous Melt Thermoforming Of Polymers; U.S. Pat. No. 4,128,369 patented Dec. 5, 1978 to William J. Kemerer et al and assigned to Hazelett Strip-Casting Corporation on a Continuous Apparatus For Forming Products Form Thermoplastic Polymeric Material Having Three-Dimensional Patterns And Surface Textures; U.S. Pat. No. 4,315,885 patented Feb. 16, 1982 to Jerome H. Lemelson on a Continuous Molding Apparatus and Method; U.S. Pat. No. 4,332,847 patented Jun. 1, 1982 to W. Rowland on a Method For Compression Molding Or Retroreflective Sheeting And Sheeting Produced Thereby; U.S. Pat. No. 4,352,771 patented Oct. 5, 1982 to Robert J. Szabo and assigned to Variform Plastics, Inc. on a Method and Apparatus For Creating Random Shadow Patterns in Formed Vinyl Sheet Article; U.S. Pat. No. 4,464,319 patented Aug. 7, 1984 to H. Halter et al on a Method Of And Apparatus For The Coiling Of Flattened Synthetic Resin Foil Tubes; U.S. Pat. No. 4,477,243 patented Oct. 16, 1984 to H. Wallsten on a Thermoforming Apparatus; U.S. Pat. No. 4,487,730 patented Dec. 11, 1984 to A. Larribe on a Process For Draping Layers Of Composite Materials; U.S. Pat. No. 4,495,135 patented Jan. 22, 1985 to L. White on a Method For Forming Container having Re-Entrant Flange; U.S. Pat. No. 4,582,666 patented Apr. 15, 1986 to I. Kenworthy et al on a Method And Apparatus For Making A Patterned Non-Woven Fabric; U.S. Pat. No. 4,634,358 patented Jan. 6, 1987 to H. Dellbrugge on an Apparatus For Flattening And Withdrawing Blown Continuous Plastic Tubular Films; U.S. Pat. No. 4,649,008 patented Mar. 10, 1987 to Thomas O. Johnstone, et al and assigned to Alcan Aluminum Corp. on a Method of Making Interlocking Vinyl Siding; U.S. Pat. No. 4,646,722 patented Apr. 14, 1987 to L. Armstrong on a Method Of Forming A Decorative Panel Of Molded Plastic; U.S. Pat. No. 4,657,625 patented Apr. 14, 1987 to H. Kawakami on an Apparatus For Producing Sheet Having Many Hollow Bodies From Thermoplastic Material; U.S. Pat. No. 4,702,877 patented Oct. 27, 1987 to L. Davis, Jr. on a Method For Molding Concrete Blocks Or Bricks; U.S. Pat. No. 4,776,998 patented Oct. 11, 1988 to P. Davidson et al on a Method For Making Refractory Shaped Articles By Cutting Vertically Hanging Extrudates and U.S. Pat. No. 4,847,034 patented Jul. 11, 1989 to K. Araki et al on a Vacuum Forming Method.

One of the main problems with prior art constructions, particularly such as U.S. Pat. No. 3,099,043, is the formation of seams. With rigid pattern forming members, they must separate while passing over the rollers. These pattern forms then rejoin for molding however a seam is forever present between adjacent sections during the vacuum forming due to the need to separate while passing around the rollers. The flexible pattern forming means of the present invention overcomes these problems in the prior art.

SUMMARY OF THE INVENTION

The present invention provides an apparatus for continuous vacuum forming of hot plasticized vinyl material upon a moving flat forming surface which includes a first roller continuously rotatably movable. A second roller is also continuously rotatably movable and is positioned laterally distanced from the first roller.

A vacuum support belt is positioned extending horizontally between and around the first and second rollers. The vacuum support belt is of a woven metallic configuration and includes sections thereof which are impregnated with a rubberized material to define vacuum sections extending therethrough. Preferably the impregnated sections extend longitudinally and laterally to define rectangular vacuum sections.

A flexibly resilient belt is positioned extending about the vacuum support belt and also the first and second rollers such as to be extending generally horizontally therebetween and be rotatable therewith. The flexibly resilient belt operatively interconnects the first and second roller with respect to one another to urge driving of one of said rollers responsive to driving of the other roller. The flexibly resilient belt is preferably of a rubberized or rubber material to facilitate moderate adherence to the vacuum support belt extending around the first and second rollers and to facilitate the creation of a moderate coefficient of friction therebetween.

A flat forming station is defined adjacent the vacuum support belt and the flexibly resilient belt at a location between the first and second rollers. A flexibly resilient pattern form design is positioned upon the flexibly resilient belt to be movable therewith. A single continuous form will preferably be secured upon the flexibly resilient belt. The pattern form preferably extends continuously longitudinally along the flexibly resilient belt and is movable through the flat forming station thereadjacent to receive the hot plasticized material for facilitating vacuum forming in the flat forming station.

Preferably the pattern form means defines a plurality of individual vacuum apertures therein to facilitate forming of the hot plasticized material against the pattern form, that is, to facilitate drawing of the hot plasticized material down in abutment with respect to the pattern form. The vacuum support belt defines a plurality of vacuum sections defined therein between sections of gas impermeable impregnated sections to facilitate the application of vacuum to the individual vacuum aperture which are in fluid flow communication with respect to said vacuum sections.

A vacuum means is included positioned immediately adjacent the flat forming station adjacent the flexibly resilient belt. This vacuum device is adapted to be in fluid flow communication with respect to the vacuum forming aperture means defined in the plastic form areas through the vacuum sections defined in the vacuum support belt in order to facilitate drawing of the hot plasticized material into abutment with respect to the flexibly resilient belt and the flat forming station in such a manner as to facilitate vacuum forming of the hot plasticized material against the pattern form. The vacuum device is preferably positioned immediately below the flexibly resilient belt means within the flat forming station as desired.

A drive means is operatively secured with respect to the first roller means to facilitate driving thereof in such a manner that driving of the first roller means will cause rotation of the flexibly resilient belt resulting in simultaneous rotation of the second roller member. In an additional preferred embodiment a cooling station may be included including a water spraying means and a water collecting means to facilitate cooling of the finally formed product while still moving along the moving flat forming surface of the flexibly resilient belt. Also a heating means may be positioned adjacent the extruder for heating the plasticized vinyl material to the desired temperature to facilitate proper flow thereof.

An output product support member may be positioned adjacent and downstream from the second roller member to facilitate support of long product exiting from abutment with respect to the pattern form means.

It is an object of the present invention to provide an apparatus for continuous vacuum forming of hot plasticized material on a moving flat forming surface wherein a seamless pattern forming means is used to form product without horizontally extending seam being present therein.

It is an object of the present invention to provide an apparatus for continuous vacuum forming of hot plasticized material on a moving flat forming surface wherein a flexibly resilient pattern forming means is utilized to facilitate quality product when used with a belt means passing through a flat forming station as well as passing over cylindrical roller means.

It is an object of the present invention to provide an apparatus for continuous vacuum forming of hot plasticized material on a moving flat forming surface wherein plasticized material is drawn against the pattern form in an area where the flexibly resilient belt is generally flat and horizontally extending.

It is an object of the present invention to provide an apparatus for continuous vacuum forming of hot plasticized material on a moving flat forming surface wherein maintenance costs are minimized.

It is an object of the present invention to provide an apparatus for continuous vacuum forming of hot plasticized material on a moving flat forming surface wherein initial capital outlay for the apparatus is minimized.

It is an object of the present invention to provide an apparatus for continuous vacuum forming of hot plasticized material on a moving flat forming surface wherein down time of the operating system is greatly minimized.

It is an object of the present invention to provide an apparatus for continuous vacuum forming of hot plasticized material on a moving flat forming surface wherein the hot plasticized material may be drawn into contact with the flexibly resilient belt responsive to the coefficient of friction existing between the flexibly resilient belt and the hot plasticized material itself.

It is an object of the present invention to provide an apparatus for continuous vacuum forming of hot plasticized material on a moving flat forming surface wherein one or more vacuum devices are in fluid flow communication with respect to apertures defined in a pattern form to facilitate drawing of hot plasticized material against the pattern form.

It is an object of the present invention to provide an apparatus for continuous vacuum forming of hot plasticized material on a moving flat forming surface wherein a cooling station is included for lowering the temperature of the hot plasticized material for final forming thereof while the formed material is still in contact with the flexibly resilient belt extending in the horizontal direction.

It is an object of the present invention to provide an apparatus for continuous vacuum forming of hot plasticized material on a moving flat forming surface wherein all processing steps occur on a horizontally extending generally flat surface.

It is an object of the present invention to provide an apparatus for continuous vacuum forming of hot plasticized material on a moving flat forming surface wherein no processing steps occur while the hot plasticized material is traveling upon a cylindrical surface.

It is an object of the present invention to provide an apparatus for continuous vacuum forming of hot plasticized material on a moving flat forming surface wherein the formation of long decorative extruded vinyl moldings can be easily achieved.

It is an object of the present invention to provide an apparatus for continuous vacuum forming of hot plasticized material on a moving flat forming surface wherein there is no length limitation on the size of the individual final products.

It is an object of the present invention to provide an apparatus for continuous vacuum forming of hot plasticized material on a moving flat forming surface wherein pattern "undercuts" are made possible with the flexing of a rubber mold during product release.

It is an object of the present invention to provide an apparatus for continuous vacuum forming of hot plasticized material on a moving flat forming surface wherein seamless final products of long length can be achieved.

It is an object of the present invention to provide an apparatus for continuous vacuum forming of hot plasticized material on a moving flat forming surface wherein additional processing steps can be performed upon the final product while still in contact with the belt carrying the pattern form such as the application of foam to one side of the product while still held in place in abutment with respect to the forming mold.

It is an object of the present invention to provide an apparatus for continuous vacuum forming of hot plasticized material on a moving flat forming surface wherein the hot plasticized material is heated to a temperature of between 380–400 degrees.

It is an object of the present invention to provide an apparatus for continuous vacuum forming of hot plasticized material on a moving flat forming surface wherein the form against which the hot plasticized material is drawn is a flexible mold.

It is an object of the present invention to provide an apparatus for continuous vacuum forming of hot plasticized material on a moving flat forming surface wherein vacuum operations can be performed upon the hot plasticized material from below or beneath as desired.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side plan view of an embodiment of the apparatus for continuous vacuum forming of hot plasticized material on a moving flat forming surface of the present invention;

FIG. 2 is a top plan view of the embodiment shown in FIG. 1;

FIG. 3 is a top plan view of an embodiment of the vacuum means of the present invention;

FIG. 4 is a three-quarter perspective view of another embodiment of the apparatus for continuous vacuum forming of hot plasticized material on the moving flat forming surface of the present invention;

FIG. 6 is a side cross-sectional view of FIG. 3 along lines 6—6.

DETAILED DESCRIPTION OF THE PREFERRED EMBODIMENT

Figure 5:
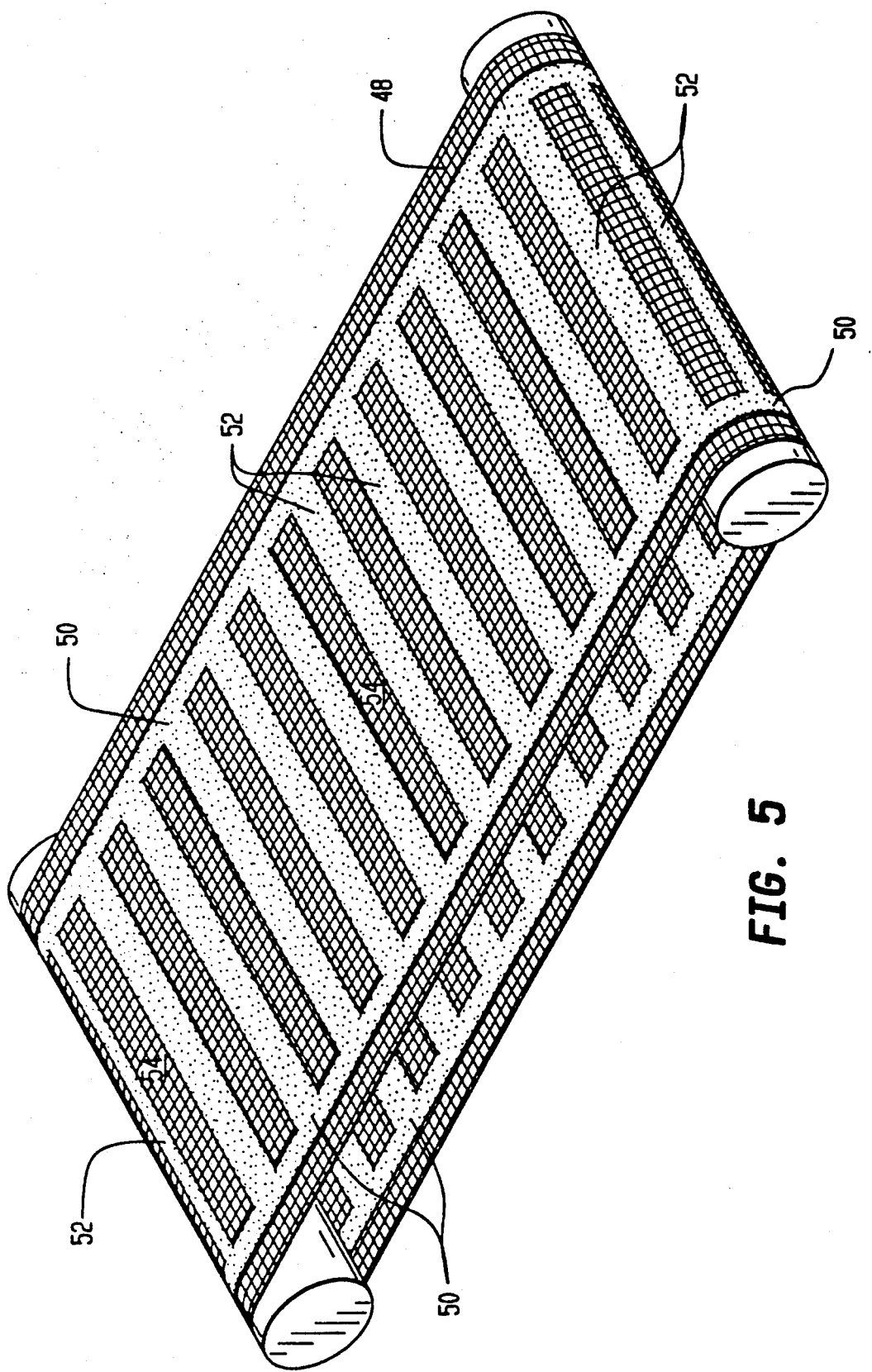
FIG. 5 is a three-quarter perspective view of an embodiment of the support belt means of the present invention shown extending around the roller members.

The present invention provides an apparatus for continuous vacuum forming of a hot plasticized material 10 such as vinyl or other materials of other similar consistency. The hot plasticized material is formed upon a flat moving surface 12 defined between a first roller member 14 and a second roller member 16. A vacuum support belt means 48 extends about both first and second roller in a horizontal direction therebetween. The vacuum support belt 48 is preferably of an open weave metallic configuration to facilitate flexing thereof and passing of air therethrough. A flexible belt means 18 passes about both the first and second rollers in a position extending over said vacuum support belt.

The first and second rollers 14 and 16 are spaced apart from one another in a generally horizontal direction such that the resilient belt means 48 extending therebetween defines the flat forming surface 12. The belt means 18 is preferably of a resilient flexible material such as rubber or rubberized material. The belt could be of any form such as interlocking metal sections, chain link, screen or hinged segments of any material.

A flat forming station 20 is defined between the first roller 14 and the second roller 16 through which the flexibly resilient belt means 18 and the vacuum support belt means 48 pass in a generally horizontal orientation. The belt 18 includes a pattern form means 22 thereon which preferably is flexibly resilient. The resilience of the pattern form means allows it to pass around the cylindrical rollers and be flexed while still retaining form. By flexing of the pattern form means 22 there is no need to form this mold form in multiple sections. Prior art devices using such multiple sections introduce horizontally extending seams into the product which is undesirable especially when forming long products such as vinyl siding sections. The pattern form means 22 preferably is one continuous longitudinally extending form as shown best in FIG. 4. The pattern form 22 includes a vacuum aperture means 24 therein normally being a plurality of individual vacuum apertures defined along the surface thereof. A vacuum means 26 is adapted to be positioned at the flat forming station 20 in abutment with vacuum support belt 48 which supports the flexibly resilient belt 18 thereon. The opposite side of the belt 18 is adapted to receive and carry the hot plasticized material 10 thereon in abutment with respect to the pattern form means 22 for shaping thereof.

The vacuum means 26 defines a plurality of main apertures 38 in the upper portion thereof. Main apertures 38 are defined to be in abutment with respect to the vacuum support belt 48. Belt 48 is preferably of an open weave metallic material including longitudinally impregnated sections 50 and laterally impregnated sections 52. Preferably these sections are impregnated with rubber-type material which is impervious to air flow therethrough. The sections 50 and 52 are adapted to define therebetween a plurality of rectangularly shaped vacuum sections 54 through which air can pass through the open weave metallic material. Preferably the vacuum apertures 24 defined in the pattern form 22 are in fluid flow communication with respect to the vacuum sections 54 which are, in turn, in fluid flow communication with respect to the apertures 24 to facilitate drawing down of the hot plasticized material 10 onto the pattern form 22. As the hot plasticized material 10 is drawn onto the flexibly resilient belt means 18, the vacuum means 26 will be activated to draw the hot vinyl material 10 into abutment with respect to the pattern form 22 to assume the pattern thereof.

The hot plasticized vinyl material 10 will be drawn from an extruder 40 positioned adjacent the input side of the apparatus of the present invention. A heating means 42 may be positioned between the extruder 40 and the flexibly resilient belt means 18 to facilitate heating of the hot plasticized material to the elevated temperature of 380 degrees to 400 degrees Fahrenheit which is the generally preferred temperature during vacuum forming.

Rotation of the first roller member 14 is achieved by operative securement of the drive means 28 with respect thereto. Drive means 28 will control movement of the first roller member 14 as well as the second roller member 16 since the vacuum support belt 48 and the flexibly resilient belt 18 both extend about the both rollers thereby urging rotation of second roller member 16 responsive to rotation of first roller member 14. Both of these rollers may be operatively mounted such as to be rotatable with respect to the housing 44 shown in FIG. 2.

To facilitate formation of the final product 30 exiting the apparatus of the present invention a cooling station 32 may be included such as a water spray means 34 and a water spray collection means 36. In this manner the final product can be cooled while still in abutment with respect to the mold in view of the fact that the mold is a horizontally extending mold and is of a rubberized flexibly resilient material thereby facilitating removal of the final cooled product with respect to the mold. To further facilitate removal of long product the apparatus may include an output product support member 46 adjacent the second roller member 16 and downstream thereof to maintain extended support of long product during final processing of the final portion thereof.

The vacuum means 26 may take the form of a plurality of individual vacuum devices as shown in FIG. 1 for forming of the hot plasticized material in multiple step operations as desired. The vacuum means 26 may also include individual vacuum chambers to form the hot plasticized material against a belt in successive steps or separate steps within the same processing apparatus. Communication of the vacuum from the vacuum device to the apertures 24 in the pattern form 22 is significantly enhanced by the vacuum sections 54 defined in the vacuum support belt 48. These vacuum sections 54 will tend to travel with the resilient belt means 18 to keep the apertures therein under constant exposure to the vacuum created by vacuum means 26. Vacuum sections 54 will tend to concentrate the available vacuum into laterally extending bands or channels.

As shown in FIG. 2 and FIG. 4 the apparatus of the present invention is preferably utilized for forming longer extending individual products such as sidings or moldings. Alternatively, if a single pattern is used continuously around the outside of the belt of the invention, this apparatus is useful for forming extremely long final products which can be much longer than the distance between the first and second roller members. The apparatus of the present invention is capable of such operation in view of the flexible resilience of the belt 18 as well as the horizontally extending profile of the pattern form 22 during draw down of the hot plasticized material 10 by vacuum means 26. Also the output support member 46 allows for additional support of longer product during forming thereof.

Most prior art devices utilize cylindrical molds against which the hot plasticized material is drawn. The cylindrical aspect of such forms provide significant difficulty in the removal of final product. For example, it has been found that it is not conceivable to finalize a product while still maintaining abutment with respect to the mold due to the fact that the product is still in an arcuate configuration. Thus, in most prior art configurations, the final product is removed from the cylindrical mold prior to cooling thereof. This additional step requires additional machinery and personnel and labor costs and as such has been found to be excessively expensive. The present invention provides a means for eliminating these additional steps by allowing cooling of the product when in contact with the final mold due to the fact that the mold extends in a horizontal plane during formation and processing of the product.

The present invention is particularly usable for forming vinyl siding or other long continuous product and it is also specifically useful for embossing the surface thereof as desired for simulating texture or whatever additional purpose may be required. The rubberized surface of the flexibly resilient belt means of the present invention is particularly useful for facilitating removal of cooled product from the mold and also for maintaining vacuum sealed contact between the vacuum means 26 and the vacuum sections 54 and on through to the apertures 24 in the flexibly resilient belt means 18 within the flat forming station 20.

The vacuum apertures 24 defined within the pattern form 22 have preferably small holes of approximately one sixty-fourth of an inch which are defined in a pattern somewhat close to one another to facilitate drawing of the hot plasticized vinyl material 10 downwardly in firm securement therealong with respect to the pattern form 22. The pattern form 22 has been found to be useful for forming protrusions or depressions as desired in the final product 30 exiting the apparatus of the present invention.

As such, the flexibility of the resilient belt means 18 as well as the definition of the forming station 20 to be in a flat orientation achieves a capability of design and flexibility of purpose not addressed heretofore by vacuum forming apparatus. In particular one of the primary advantages of the present invention is the ability to form long product while using a small processing station. With the flexibly resilient belt and pattern form, the length of the product can actually be longer than the total circumferential length of the flexible belt means. That would mean that one portion of a continuous flexible pattern could be utilized in the forming of two or more portions of one piece of product. Thus a very long product could be vacuum formed utilizing a relatively short belt. This effective use of factory floor space has not been possible in the heretofore prior art without the introduction of unwanted seams in the final product.

Additional processing stations can be included after formation of the product such as the common requirement of lining a finally formed product of vinyl plasticized material 10 with products such as foam or the like. While the final form product 30 is still in contact with respect to the pattern form 22 and belt 18 it is possible to apply foam or other lining materials thereon due to the fact that exiting product 30 is maintained in a horizontal orientation even after cooling thereof.

An additional advantage of positioning of a vacuum support belt 48 between rollers 14 and 16 and the resilient belt means 18 is to facilitate tracking between the two belts and the two rollers. With the use of a woven metal vacuum support belt 48 and a silicon-based rubber flexible belt 18, there will be some small amount of sliding movement between the belts 18 and 48. This slight movement has been found to be particularly helpful in maintaining tracking between the belts and the rollers.

There are many aspects of the apparatus of the present invention that tend to untrack the belts such as the high temperature of operation of the system or the difference in distance from the axis of the rollers 14 and 16 at which the hot material is positioned versus the position of the silicon rubber belt. Tracking is also made more difficult due to the different elasticity of the different materials such as the silicon-based rubber of the belts 18 and the metallic materials of belt 48. To alleviate untracking the coefficient of friction between the metal weave belt 48 and the resilient silicon rubber belt 18 is high enough to assure powering therebetween but low enough to allow for some sliding movement therebetween to compensate for some of the tracking irregularities.

To facilitate such limited sliding relative movement, it has been found to be particularly advantageous to provide a chamfered low edge 56 on the lower end of the vacuum apertures 38. To facilitate passage of the vacuum support belt over the vacuum means 26 it has been determined to be preferred to coat the upper such of vacuum means 26 adjacent the apertures therein with a material having a low coefficient of friction such as polytetrafluroethylene.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for continuous vacuum forming of hot plasticized material onto a moving flat forming surface comprising:

a) a housing means;

b) a first roller member movably mounted on said housing means to be rotatable with respect thereto;

c) a second roller member movably mounted on said housing means to be rotatable with respect thereto, said second roller member being spatially disposed from said first roller means to be horizontally spaced therefrom;

d) a vacuum support belt means extending about said first roller member and said second roller member to be moveable therewith, said vacuum support belt means being of a woven flexible material to facilitate air flow therethrough and flexible resiliency thereof, said vacuum support belt means including impregnated sections defined thereon being impregnated with a gas impermeable material to prevent air flow therethrough, said impregnated sections extending along said vacuum support belt means to define a plurality of vacuum sections therebetween to facilitate air flow therethrough;

e) a flexibility resilient belt means extending about said vacuum support belt means to be movable therewith;

f) a flat forming station defined on said housing means adjacent said flexibly resilient belt means and adjacent said vacuum support belt means at a location between said first roller member and said second roller member, said flat forming station being stationary with respect to said flexibly resilient belt means and said vacuum support belt means;

g) a pattern form means positioned upon said flexibly resilient belt means and also being flexibly resilient and movable therewith, said pattern form means being seamless and continuously movable through said flat forming station adjacent said vacuum support belt means to receive the hot plasticized material thereon for vacuum forming thereagainst, said pattern form means defining a plurality of vacuum aperture means therein to facilitate vacuum forming of hot plasticized material thereagainst, said vacuum apertures in said pattern form means being in fluid flow communication with respect to said vacuum sections defined in said vacuum support belt means to facilitate air flow therethrough; and h) a vacuum means positioned immediately adjacent said flat forming station adjacent said vacuum support belt means moving therealong, said vacuum means being stationary with respect to said vacuum support belt means and said flexibly resilient belt means moving therealong, said vacuum means being maintained in fluid flow communication with respect to said vacuum sections of said vacuum support belt means and said vacuum aperture means defined in said pattern form means during movement therealong to facilitate drawing of the hot plasticized material into abutment with respect to said flexibly resilient belt means within said flat forming station to facilitate vacuum forming thereof against said pattern form means thereon.

2. An apparatus for continuous vacuum forming of hot plasticized material onto a moving flat forming surface as defined in claim 1 wherein said flexibly resilient belt means extends in a generally horizontally extending orientation between said first roller member and said second roller member through said flat forming station.

3. An apparatus for continuous vacuum forming of hot plasticized material onto a moving flat forming surface as defined in claim 1 further including an output product support member positioned adjacent said second roller member to support formed plasticized material exiting from said apparatus.

4. An apparatus for continuous vacuum forming of hot plasticized material onto a moving flat forming surface as defined in claim 1 wherein said pattern form means extends continuously longitudinally along said flexibly resilient belt means.

5. An apparatus for continuous vacuum forming of hot plasticized material onto a moving flat forming surface as defined in claim 1 further including a drive means operatively secured with respect to said first roller member to facilitate driving thereof.

6. An apparatus for continuous vacuum forming of hot plasticized material onto a moving flat forming surface as defined in claim 1 wherein said flexibly resilient belt means is of a rubberized material.

7. An apparatus for continuous vacuum forming of hot plasticized material onto a moving flat forming surface as defined in claim 1 wherein said flexibly resilient belt means is of a fabric material.

8. An apparatus for continuous vacuum forming of hot plasticized material onto a moving flat forming surface as defined in claim 1 wherein said flexibly resilient belt means includes a rubberized coating thereon.

9. An apparatus for continuous vacuum forming of hot plasticized material onto a moving flat forming surface as defined in claim 1 further including a cooling station adapted to receive said flexibly resilient belt means passing therethrough after passing through said flat forming station.

10. An apparatus for continuous vacuum forming of hot plasticized material onto a moving flat forming surface as defined in claim 1 wherein said vacuum means is positioned immediately below said vacuum support belt means within said flat forming station.

11. An apparatus for continuous vacuum forming of hot plasticized material onto a moving flat forming surface as defined in claim 1 wherein said vacuum support belt comprises a flexibly resilient woven metallic belt.

12. An apparatus for continuous vacuum forming of hot plasticized material onto a moving flat forming surface as defined in claim 1 wherein said impregnated sections of said vacuum support belt are impregnated with a rubberized material which is gas impermeable.

13. An apparatus for continuous vacuum forming of hot plasticized material onto a moving flat forming surface as defined in claim 1 wherein the coefficient of friction between said vacuum support belt means and said flexibly resilient belt means is low enough to allow slippage therebetween to facilitate tracking therebetween during rotational movement of said first roller member and said second roller member.

14. An apparatus for continuous vacuum forming of hot plasticized material onto a moving flat forming surface as defined in claim 1 further including heating means for heating of the hot plasticized material as required.

15. An apparatus for continuous vacuum forming of hot plasticized material onto a moving flat forming surface as defined in claim 1 wherein said impregnated sections comprise:
   a) a plurality of longitudinal divider sections extending longitudinally with respect to said vacuum support belt means; and
   b) a plurality of lateral divider sections extending laterally across said vacuum support belt means and intersecting with said longitudinal divider sections to define said vacuum sections therebetween.

16. An apparatus for continuous vacuum forming of hot plasticized material onto a moving flat forming surface as defined in claim 15 wherein said vacuum sections defined by said vacuum support belt means are rectangularly shaped.

17. An apparatus for continuous vacuum forming of hot plasticized material onto a moving flat forming surface as defined in claim 1 wherein said vacuum aperture means are chamfered adjacent said vacuum support belt means to facilitate tracking and abutment between said flexibly resilient belt means and said vacuum support belt means.

18. An apparatus for continuous vacuum forming of hot plasticized material onto a moving flat forming surface as defined in claim 1 wherein said flexibly resilient belt means is made of silicon-base rubber material.

19. An apparatus for continuous vacuum forming of hot plasticized material onto a moving flat forming surface comprising:
   a) a housing means;
   b) a first roller member movably mounted on said housing means to be rotatable with respect thereto;
   c) a second roller member movably mounted on said housing means to be rotatable with respect thereto, said second roller member being spatially disposed from said first roller means to be horizontally spaced therefrom;
   d) a vacuum support belt means extending horizontally about said first roller member and said second roller member to be moveable therewith, said vacuum support belt means being of a woven flexible metallic material to facilitate air flow therethrough and flexible resiliency thereof, said vacuum support belt means including impregnated sections defined thereon being impregnated with a gas impermeable rubberized material to prevent air flow therethrough, said impregnated sections extending along said vacuum support belt means and comprising:
      1) a plurality of longitudinal divider sections extending longitudinally with respect to said vacuum support belt means;
      2) a plurality of lateral divider sections extending laterally across said vacuum support belt means and intersecting with said longitudinal divider sections to define rectangularly shaped vacuum sections therebetween;
   e) a flexibly resilient belt means of silicon-based rubber material extending horizontally around said vacuum support belt means to be movable therewith;
   f) a flat forming station defined on said housing means adjacent said flexibly resilient belt means and adjacent said vacuum support belt means at a location between said first roller member and said second roller member, said flat forming station being stationary with respect to said flexibly resilient belt means and said vacuum support belt means;
   g) a pattern form means of silicon-based rubber material positioned extending longitudinally along said flexibly resilient belt means and extending completely therearound, said pattern form means being flexibly resilient and movable with said flexibly resilient belt means, said pattern form means being seamless and continuously movable through said flat forming station adjacent said vacuum support belt means to receive the hot plasticized material thereon for vacuum forming thereagainst, said pattern form means defining a plurality of vacuum forming aperture means therein to facilitate vacuum forming of hot plasticized material thereagainst, said vacuum apertures in said pattern form means being in fluid flow communication with respect to said vacuum sections defined in said vacuum support belt means to facilitate air flow therethrough;
   h) a vacuum means positioned immediately adjacent and below said flat forming station adjacent said vacuum support belt means moving therealong, said vacuum means being stationary with respect to said vacuum support belt means and said flexibly resilient belt means moving therealong, said vacuum means being maintained in fluid flow communication with respect to said vacuum sections of said vacuum support belt means and said vacuum aperture means defined in said pattern form means during movement therealong to facilitate drawing of the hot plasticized material into abutment with respect to said flexibly resilient belt means within said flat forming station to facilitate vacuum forming thereof against said pattern form means thereon;
   i) output product support member positioned adjacent said second roller member to support formed plasticized material exiting from contact with said flexibly resilient belt means;
   j) a drive means operatively secured with respect to said first roller member to facilitate driving thereof; and
   k) a cooling station adapted to receive said flexibly resilient belt means and said vacuum support belt means extending therethrough after passing through said flat forming station to aid in cooling of the hot plasticized material in abutment with said pattern form means.

* * * * *